(12) United States Patent
Wang et al.

(10) Patent No.: US 8,823,190 B2
(45) Date of Patent: Sep. 2, 2014

(54) WIND POWER CONVERTER STRUCTURE AND WIND POWER GENERATION SYSTEM INCLUDING THE SAME

(75) Inventors: Chang-Yong Wang, Pudong Shanghai (CN); Yan-Song Lu, Pudong Shanghai (CN); Shu-Sun Qu, Pudong Shanghai (CN)

(73) Assignee: Delta Electronics (Shanghai) Co., Ltd. (CN)

( * ) Notice: Subject to any disclaimer, the term of this patent is extended or adjusted under 35 U.S.C. 154(b) by 0 days.

(21) Appl. No.: 13/611,603

(22) Filed: Sep. 12, 2012

(65) Prior Publication Data

US 2013/0182465 A1 Jul. 18, 2013

(30) Foreign Application Priority Data

Jan. 17, 2012 (CN) .......................... 2012 1 0014332

(51) Int. Cl.
*H02J 3/38* (2006.01)
(52) U.S. Cl.
USPC .......................................... 290/44; 307/151
(58) Field of Classification Search
CPC .................................................... H02J 3/38
USPC ......................................................... 290/44
See application file for complete search history.

(56) References Cited

U.S. PATENT DOCUMENTS

| | | | |
|---|---|---|---|
| 6,946,751 B2 * | 9/2005 | Yoshida et al. | 290/44 |
| 7,859,125 B2 * | 12/2010 | Nielsen et al. | 290/44 |
| 2003/0151259 A1 * | 8/2003 | Feddersen et al. | 290/44 |
| 2004/0222642 A1 * | 11/2004 | Siebenthaler et al. | 290/44 |
| 2005/0012339 A1 * | 1/2005 | Mikhail et al. | 290/44 |
| 2007/0267873 A1 * | 11/2007 | Teichmann | 290/44 |
| 2009/0218820 A1 * | 9/2009 | Gertmar et al. | 290/44 |
| 2009/0224607 A1 * | 9/2009 | Kjaer et al. | 307/82 |
| 2009/0322081 A1 * | 12/2009 | Wagoner et al. | 290/44 |
| 2010/0014325 A1 * | 1/2010 | Raju et al. | 363/37 |
| 2010/0327666 A1 * | 12/2010 | Abolhassani et al. | 307/151 |
| 2012/0007444 A1 * | 1/2012 | Zapata et al. | 307/115 |
| 2012/0195081 A1 * | 8/2012 | Reddy et al. | 363/67 |
| 2013/0020989 A1 * | 1/2013 | Xia et al. | 320/109 |
| 2014/0078800 A1 * | 3/2014 | Wagoner et al. | 363/127 |

FOREIGN PATENT DOCUMENTS

CN  201388064 Y  *  1/2010
CN  101123352     9/2010

* cited by examiner

*Primary Examiner* — Joseph Waks
(74) *Attorney, Agent, or Firm* — Lowe Hauptman & Ham, LLP

(57) ABSTRACT

A wind power converter structure and a wind power generation system including the converter structure are provided. The converter structure includes a plurality of generator-side converters arranged in a nacelle located on a top part of the tower; a plurality of grid-side converters arranged on a bottom part of the tower or outside the tower, wherein a DC input side of the grid-side converter is coupled to a DC output side of the generator-side converter; at least one DC bus connected between the generator-side converter and the grid-side converter; and an isolation transformer of which a primary side is coupled to the AC output side of the grid-side converter, wherein a secondary side of the isolation transformer is coupled to a power grid.

18 Claims, 10 Drawing Sheets

WIND POWER CONVERTER STRUCTURE AND WIND POWER GENERATION SYSTEM INCLUDING THE SAME

RELATED APPLICATIONS

This application claims priority to Chinese Application Serial Number 201210014332.6, filed Jan. 17, 2012, which is herein incorporated by reference.

BACKGROUND

1. Field of Invention

The present invention relates to a wind power generation system. More particularly, the present invention relates to a wind power converter structure in the wind power generation system.

2. Description of Related Art

Currently, with continuously increasing rated power of a wind power turbine, the length of a wind wheel blade is gradually increased but the rotational speed of a rotor is gradually decreased. For example, in a wind power turbine with a rated power of 5 MW, the blade length is longer than 60 m, and the rated rotational speed of the rotor is about 10 rpm. When a power generator has two opposite poles, the gear ratio of a mechanical gearbox should be set to 150, such that the 5 MW wind power generator is directly connected with a power grid having a power frequency of 50 Hz in an AC manner. However, increasing the gear ratio of the mechanical gearbox will cause multiple challenges to designing and manufacturing the gearbox of the megawatt wind power turbine, because when the rated power of the wind power turbine and the gear ratio of the gearbox are increased, the dimension, weight and frictional wear of the wind power turbine are also increased. Thus, a full-power wind power converter is gradually adopted in the prior art for connecting the megawatt wind power turbine with the power grid in an AC-DC-AC manner, so as to solve the problems caused by continuously increasing gear ratio of the gearbox.

In particular, the full-power wind power converter is a back-to-back frequency conversion system formed by connecting two sets of power electronic converters via a DC link. The back-to-back frequency conversion system includes a converter at a power grid side (or referred to as a "grid-side converter") and a converter at a power generator side (or referred to as a "generator-side converter"). The generator-side converter receives and transfers active power generated by an induction generator to the grid-side converter via the DC link. Furthermore, the generator-side converter further excites the induction generator through the stator terminal of the induction generator. Subsequently, the grid-side converter receives and transfers the active power transferred via the DC link to the power grid, i.e. enables voltages at two sides of the DC link to reach balance.

In the prior art, the full-power wind power converter is bigger with the increase of the capacity of the wind power generator. Taking the current mainstream power grade of 1-3 MW (in the future the power may be increased to 5-8 MW) as an example, there are two types of arrangement locations of the wind power converter in the entire wind power turbine. In one type, the wind power converter is arranged in a top part of a tower, and in the other type, the wind power converter is arranged in a bottom part of the tower. However, if the wind power converter is arranged in the top part of the tower, the space in the nacelle located at the top part of the tower is limited and the load design of the nacelle should also be enhanced. Once the wind power converter is out of order, a maintenance person has to climb to the top part of the tower for performing maintenance. Since the height of the tower is generally about 100 m, this type of arrangement location has not only a potential safety risk but also a high maintenance cost. Furthermore, if the wind power converter is arranged in the bottom part of the tower, although the maintenance person does not need to climb to the top part of the tower for performing maintenance, yet the cost of a cable connected between the wind power generator located in the top part of the tower and the wind power converter located in the bottom part of the tower is increased with the power increasing of the wind power generator. Especially for a three-phase power generator, longer transmission cables are required, thus not only increasing the purchase cost of cables but also the system installation cost of the wind power turbine.

In view of this, those in the industry are endeavoring to find ways to design a more appropriate wind power converter structure, which can not only balance the load design of the nacelle located on the top of the tower, but also ensure operation reliability of the wind power converter as well as reducing the installation cost of the transmission cable.

SUMMARY

In order to overcome the disadvantages found in the design and installation of a conventional wind power converter structure, the present invention provides a wind power converter structure and a wind power generation system including the wind power converter structure.

An aspect of the present invention is to provide a converter structure used in a wind power generation system including a tower. The converter structure includes a plurality of generator-side converters, a plurality of grid-side converters, at least one DC bus and an isolation transformer. The multiple generator-side converters are arranged in a nacelle located on a top part of the tower. Each generator-side converter has an AC input side and a DC output side. The AC input side of the generator-side converter is connected to a three-phase winding of the wind power generator, and the DC output side of the generator-side converter outputs a DC voltage. The grid-side converters are arranged on a bottom part of the tower or outside the tower. Each grid-side converter has a DC input side and an AC output side. The DC input side of the grid-side converter is coupled to the DC output side of the generator-side converter. The at least one DC bus is connected between the DC output side of the generator-side converter and the DC input side of the grid-side converter. The primary side of the isolation transformer is electrically connected to the AC output side of the grid-side converter, and the secondary side of the isolation transformer is electrically connected to a power grid. The isolation transformer boosts and transfers an AC voltage outputted by the AC output side of the grid-side converter to the power grid.

Each generator-side converter is a three-phase PWM (pulse width modulation) rectifier for rectifying the AC voltage from the wind power generator into the DC voltage. Each grid-side converter is a three-phase PWM inverter for inverting the DC voltage from the three-phase PWM rectifier into the AC voltage.

The generator-side converters include a first set of generator-side converters and a second set of generator-side converters, and the grid-side converters include a first set of grid-side converters and a second set of grid-side converters. The DC output sides of the first set of generator-side converters are connected to the DC input sides of the first set of grid-side converters via a DC bus. The DC output sides of the second set of generator-side converters are connected to the DC input sides of the second set of grid-side converters via another DC bus.

In a specific embodiment, each of the first set of generator-side converters and the second set of generator-side converters includes a first generator-side converter and a second generator-side converter. The AC input side of the first generator-side converter is electrically connected to a three-phase winding. The AC input side of the second generator-side converter is electrically connected to another three-phase winding. Furthermore, the first and second generator-side converters are both bridge circuits. Each of the bridge circuits is formed from a two-level bridge arm, a three-level bridge arm or a Vienna circuit.

In another specific embodiment, each of the first set of the grid-side converters and the second set of grid-side converters includes a first grid-side converter and a second grid-side converter.

The isolation transformer is a multi-winding transformer. Multiple windings at the primary side of the isolation transformer are coupled to respective AC output sides of the first grid-side converter and the second grid-side converter. The secondary side of the isolation transformer is connected to the power grid. The respective AC output sides of the first grid-side converter and the second grid-side converter are connected to the isolation transformer via a filter unit.

The isolation transformer is a double-winding transformer. A single winding at the primary side of the isolation transformer is connected to each of the AC output sides of the first grid-side converter and the second grid-side converter via a circulating-current restraining unit. A filter unit is further arranged between the circulating-current restraining unit and the isolation transformer.

The converter structure further includes a DC midpoint bus. When the generator-side converter and the grid-side converter are three-level bridge arms, the DC midpoint bus is connected between the DC midpoint of the generator-side converter and the DC midpoint of the grid-side converter. Certainly, the DC midpoint bus used for connecting the generator-side converter and the grid-side converter may be omitted, and the balance of midpoint potential of DC voltage can be by controlling the generator-side converter and the grid-side converter.

In a specific embodiment, the converter structure further includes a first circulating-current control module arranged in the generator-side converters. The first circulating-current control module includes a torque controller, a generator-side control module and a current comparator. The torque controller is used for receiving a generator torque of the wind power generator. The generator-side control module includes a generator-side current control unit and a circulating-current control unit. The generator-side current control unit is electrically connected to the torque controller and the generator-side converter for performing current control according to the current signal inputted into the generator-side converter and a given signal. The current comparator receives and compares the current signal inputted into the first generator-side converter with the current signal inputted into the second generator-side converter, so as to output a comparison signal. The comparison signal is transferred to a corresponding circulating-current control unit so as to control the circulating current formed between the first generator-side converter and the second generator-side converter.

In another specific embodiment, the converter structure further includes a second circulating-current control module arranged in the grid-side converters. The DC sides of the grid-side converters are connected to a common DC bus of the generator-side converters, and the AC sides of the grid-side converters are connected together via a circulating-current control unit. The second circulating-current control module includes a voltage controller, a grid-side control module and a current comparator. The voltage controller receives the DC voltage transferred via the DC bus. The grid-side control module includes a grid-side current control unit and a circulating-current control unit. The grid-side current control unit is electrically connected to the voltage controller and the grid-side converter for controlling the current according to the current signal inputted into the grid-side converter and a given signal. The current comparator receives and compares the current signal inputted into the first grid-side converter with the current signal inputted into the second grid-side converter, so as to output a comparison signal. The comparison signal is transferred to a corresponding circulating-current control unit so as to control the circulating current formed between the first grid-side converter and the second grid-side converter.

The wind power generator is a three-phase full-power wind power generator. The three-phase full-power wind power generator is a permanent magnet synchronous generator or an electrically excited synchronous generator.

Another aspect of the present invention provides a full-power wind power generation system. The full-power wind power generation system includes a wind power generator and a full-power wind power converter which adopts the aforementioned converter structure.

In on embodiment, the wind power generator is a permanent magnet wind power generator or an electrically excited wind power generator.

By adopting the converter structure of the present invention for wind power and the wind power generation system including the converter structure, wherein the generator-side converters of the wind power converter are arranged in the nacelle located on the top part of the tower; the grid-side converters of the wind power converter are arranged on the bottom part of the tower or outside the tower; and the power is transferred by the DC bus connected between the DC output side of the generator-side converter and the DC input side of the grid-side converter, thereby not only reducing the cost of cables required for transferring signals between the top and bottom parts of the tower, but also balancing the bearing load of the tower. For the full-power wind power generator, multiple three-phase PWM rectifiers are arranged in the top part of the tower, and output sides of the PWM rectifiers are connected in parallel, and multiple three-phase PWM inverters are arranged in the bottom part of the tower, and the input sides of these PWM inverters are connected in parallel, so as to receive the DC voltage transferred by the DC bus. Thus, a mutual redundancy safety operation mechanism can be performed between the three-phase PWM rectifiers and the three-phase PWM inverters so as to improve the operation reliability and stability of the wind power converter. When one of a three-phase PWM rectifier unit and three-phase PWM inverter unit is out of order, the other of the PWM rectifier unit and the PWM inverter unit can still be operated normally. Furthermore, respective DC sides of the multiple three-phase PWM rectifiers may not have to be connected in parallel, and instead, are connected from the top part to the bottom part of the tower via respective DC buses.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
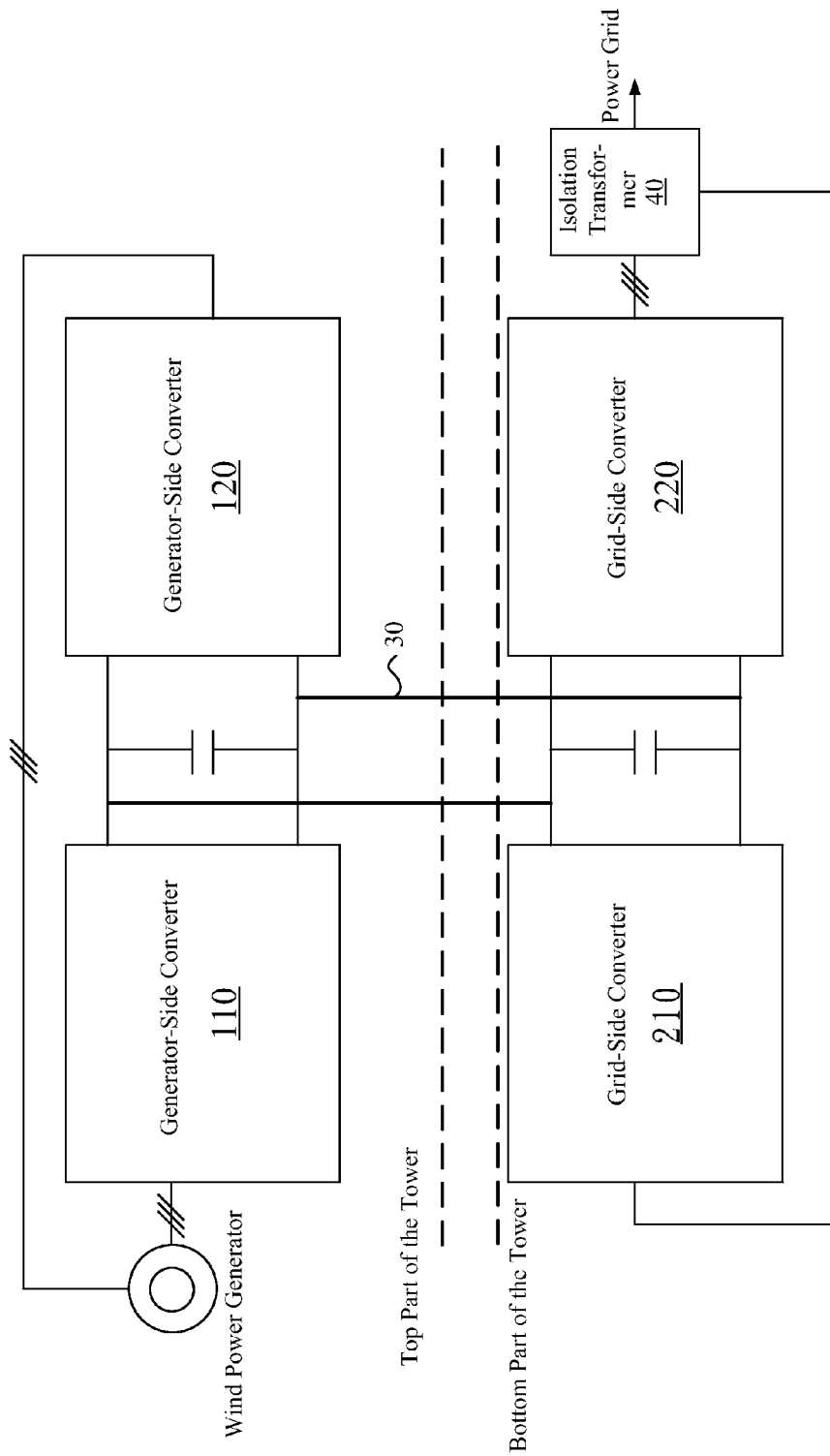
FIG. 1 illustrates a structural block diagram showing a wind power converter according to an embodiment of the present invention.

In order to make the description of the present invention more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present invention. Moreover, the accompanying drawings are only illustrative and are not made according to the original size.

Specific implementations in various aspects of the present invention are further described in details below with reference to the accompanying drawings.

FIG. 1 illustrates a structural block diagram showing a wind power converter according to an embodiment of the present invention. Referring to FIG. 1, the wind power converter includes generator-side converters 110 and 120, grid-side converters 210 and 220, a DC bus 30 and an isolation transformer 40. The generator-side converters 110 and 120 are arranged in a top part of a tower (such as in a nacelle located on the top part of the tower), and each generator-side converter has an AC input side and a DC output side. The AC input side of the generator-side converter is connected to a wind power generator, and the DC output side of the generator-side converter outputs a DC voltage. In an embodiment, the wind power generator is a three-phase power generator. Each AC input side of the generator-side converters 110 and 120 is electrically connected to a three-phase winding of the three-phase power generator. In another embodiment, the wind power generator is a multi-phase power generator. Respective AC input sides of the generator-side converters 110 and 120 are electrically connected to different three-phase windings of the three-phase power generator.

The grid-side converters 210 and 220 are arranged on a bottom part of the tower or outside the tower. Each grid-side converter has a DC input side and an AC output side. The DC input side of the grid-side converter is coupled to the DC output side of the generator-side converter by the DC bus 30, and the AC output side of the grid-side converter is coupled to the isolation transformer 40. In an embodiment, the isolation transformer 40 is a double-winding transformer of which a primary side only includes one winding, and the primary side of the isolation transformer is electrically connected to respective AC output sides of the grid-side converters 210 and 220. In another embodiment, the isolation transformer 40 is a multi-winding transformer of which the primary side includes multiple windings, and different windings in the primary side of the isolation transformer 40 are connected to the AC output sides of the grid-side converters 210 and 220.

It should be noted that two horizontal dash lines shown in FIG. 1 are used for distinguishing the top part and the bottom part of the tower. That is, the part above the first horizontal dash line is referred to as the top part of the tower, for example, the top part of the tower is at a distance of 100 m from the ground, and the part below the second horizontal dash line is referred to as the bottom part of the tower. It should be understood by those skilled in the art that, the grid-side converters 210 and 220 not only can be arranged on the bottom part of the tower, but also can be arranged outside the tower, and power is transferred via the generator-side converters 110 and 120 arranged on the top part of the tower and a transmission cable.

It should be understood by those skilled in the art that, in the wind power converter shown in FIG. 1 the DC output sides of the generator-side converters 110 and 120 are connected in parallel. However, the present invention is not limited thereto. In other embodiments, the DC output side of the generator-side converter 110 is connected to the grid-side converter arranged in the bottom part of the tower via a DC bus, and the DC output side of the generator-side converter 120 is connected to the grid-side converter in the bottom part of the tower via another DC bus. Thus, the DC output sides of the generator-side converters 110 and 120 do not have to be connected in parallel.

Figure 2:
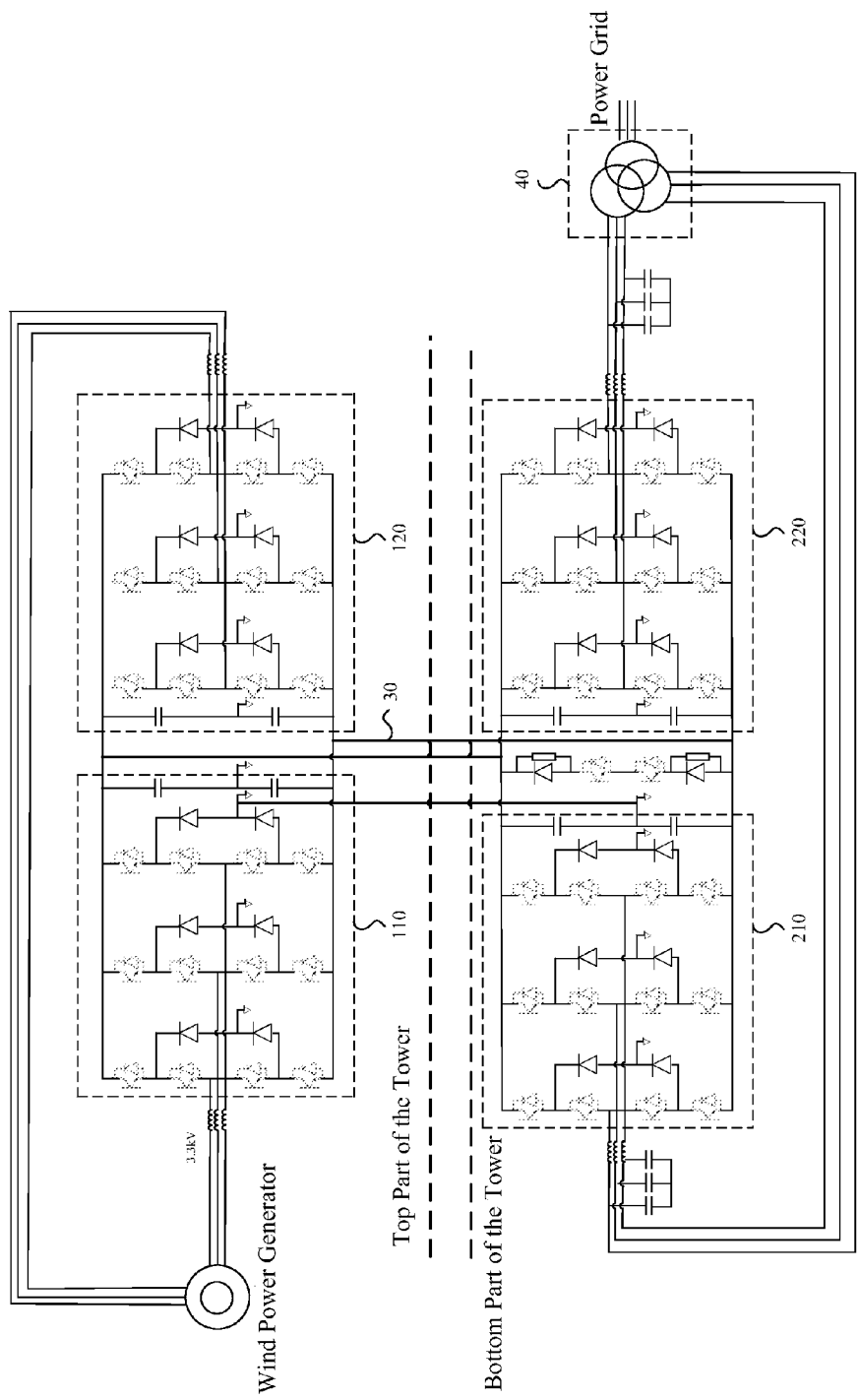
FIG. 2 illustrates a schematic circuit structure diagram showing an example of the wind power converter shown in FIG. 1.

FIG. 2 illustrates a schematic circuit structure diagram showing an example of the wind power converter shown in FIG. 1. Referring to FIG. 2, the wind power converter includes generator-side converters 110 and 120, grid-side converters 210 and 220, at least one DC bus 30 and an isolation transformer 40, where the generator-side converters 110 and 120 both are three-level circuits.

In particular, the generator-side converters 110 and 120 are arranged on the top part of the tower, such as in the nacelle located on the top part of the tower. Each generator-side converter has an AC input side and a DC output side. The AC input side is connected to a three-phase winding of the wind power generator and the DC output side outputs a DC voltage. Taking the generator-side converter 110 as an example, the AC input side of the generator-side converter 110 receives an AC voltage of 3.3 kV outputted by the three-phase winding of the wind power generator, and the DC output side of the generator-side converter 110 outputs a DC voltage.

The grid-side converters 210 and 220 are arranged on the bottom part of the tower or outside the tower. Each grid-side converter has a DC input side and an AC output side. The DC input side of the grid side converter is coupled to the DC output side of the generator-side converter. Taking the grid-side converter 210 as an example, the DC input side of the grid-side converter 210 receives and inverts the DC voltage from the DC bus 30 into an AC voltage.

The isolation transformer 40 includes a primary side and a secondary side. The primary side of the isolation transformer 40 is electrically coupled to the AC output sides of the grid-side converters 210 and 220, and the secondary side of the isolation transformer 40 is electrically coupled to an AC power grid. The isolation transformer 40 boosts and transfers the AC voltage outputted by respective AC output sides of the grid-side converters 210 and 220 to an AC power grid. In FIG. 2, the isolation transformer 40 is a multi-winding transformer of which the primary side includes multiple windings. In these windings, a winding is coupled to the AC output side of the grid-side converter 210, and another winding is coupled to the AC output side of the grid-side converter 220. Furthermore, in order to filter the AC voltage outputted by the grid-side converters 210 and 220, a filter unit may be further arranged between respective AC output sides of the grid-side converters 201 and 220 and the primary side of the isolation transformer 40. The filter unit is, for example, a capacitor.

In a specific embodiment, each of the generator-side converters such as the generator-side converters 110 and 120 is a three-phase PWM (pulse width modulation) rectifier for rectifying the AC voltage from the wind power generator into the DC voltage. In another embodiment, each of the grid-side converters such as the grid-side converters 210 and 220 is a three-phase PWM inverter for inverting the DC voltage from the generator-side converter mentioned above into the AC voltage.

In a specific embodiment, the generator-side converters 110 and 120 may be arranged as a set of generator-side converters (or a pair of generator-side converters), and the DC output sides of the generator-side converters 110 and 120 are connected in parallel. Similarly, the grid-side converters 210 and 220 may also be arranged as a set of grid-side converters (or a pair of grid-side converters), and the DC input sides of the grid-side converters 210 and 220 are connected in parallel. It should be pointed out that, in the three-level wind power converter shown in FIG. 2, the electric potentials as well as the voltages at two output terminals of the DC output side of the generator-side converter 110 or 120 have opposite polarities, and the clamping is performed via a DC midpoint. Thus, a DC midpoint bus is further connected between the generator-side converters 110, 120 and the grid-side converters 210, 220. Through this DC midpoint bus, the DC midpoint of the generator-side converter is electrically connected with the DC midpoint of the grid-side converter.

Furthermore, the aforementioned wind power generator connected with the three-level wind power converter is a three-phase full-power wind power generator. The three-phase full-power wind power generator is such as a permanent magnet synchronous generator or an electrically excited synchronous generator.

Figure 3:
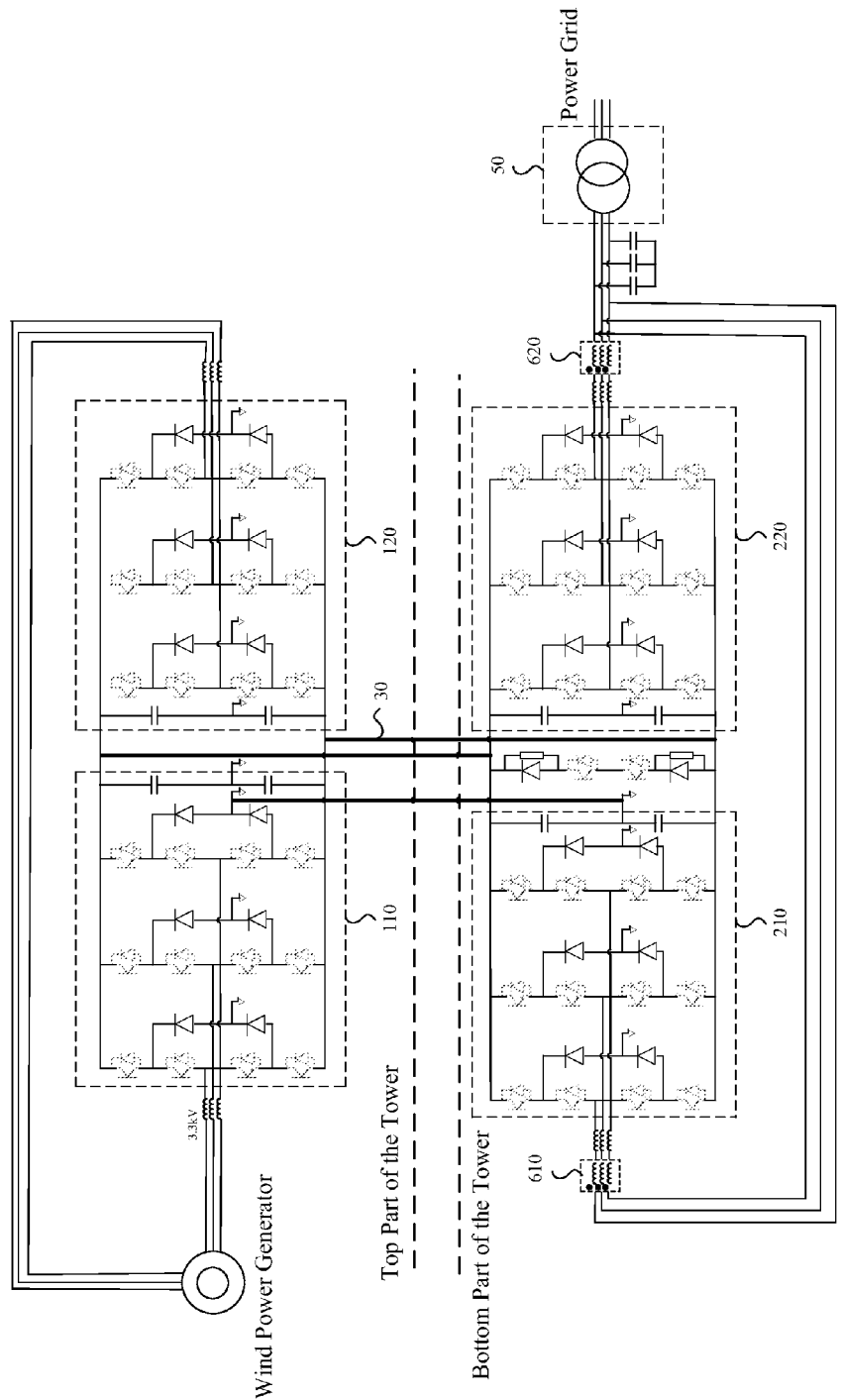
FIG. 3 illustrates a schematic circuit structure diagram showing an alternative example of the wind power converter shown in FIG. 1.

FIG. 3 illustrates a schematic circuit structure diagram showing an alternative embodiment of the wind power converter shown in FIG. 2. Similar to FIG. 2, in FIG. 3, the three-level wind power converter also includes the generator-side converters 110 and 120, grid-side converters 210 and 220, and at least one DC bus 30. A detailed description of the generator-side converters, the grid-side converters and the DC bus has been provided in the description of FIG. 2, and thus for simplicity of description, it is not illustrated herein again.

The difference found in a comparison between FIGS. 2 and 3 is that, the three-level wind power converter in FIG. 3 includes an isolation transformer 50. The isolation transformer 50 is a double-winding transformer. That is, the primary side has a single winding as well as the secondary side. As shown in FIG. 3, the single winding at the primary side of the isolation transformer 50 is electrically coupled to the AC output side of the grid-side converter 210 via a circulating-current restraining unit 610, and meanwhile the single winding at the primary side of the isolation transformer 50 is electrically coupled to the AC output side of the grid-side converter 220 via another circulating-current restraining unit 620, so as to restrain the circulating current of respective AC output sides of the grid-side converters 210 and 220 by the circulating-current restraining units 610 and 620.

In a specific embodiment, a filter unit may be further arranged between the circulating-current restraining unit 610 (or the circulating-current restraining unit 620) and the primary side of the isolation transformer 50, so as to filter the AC voltage inputted into the isolation transformer 50.

Figure 4:
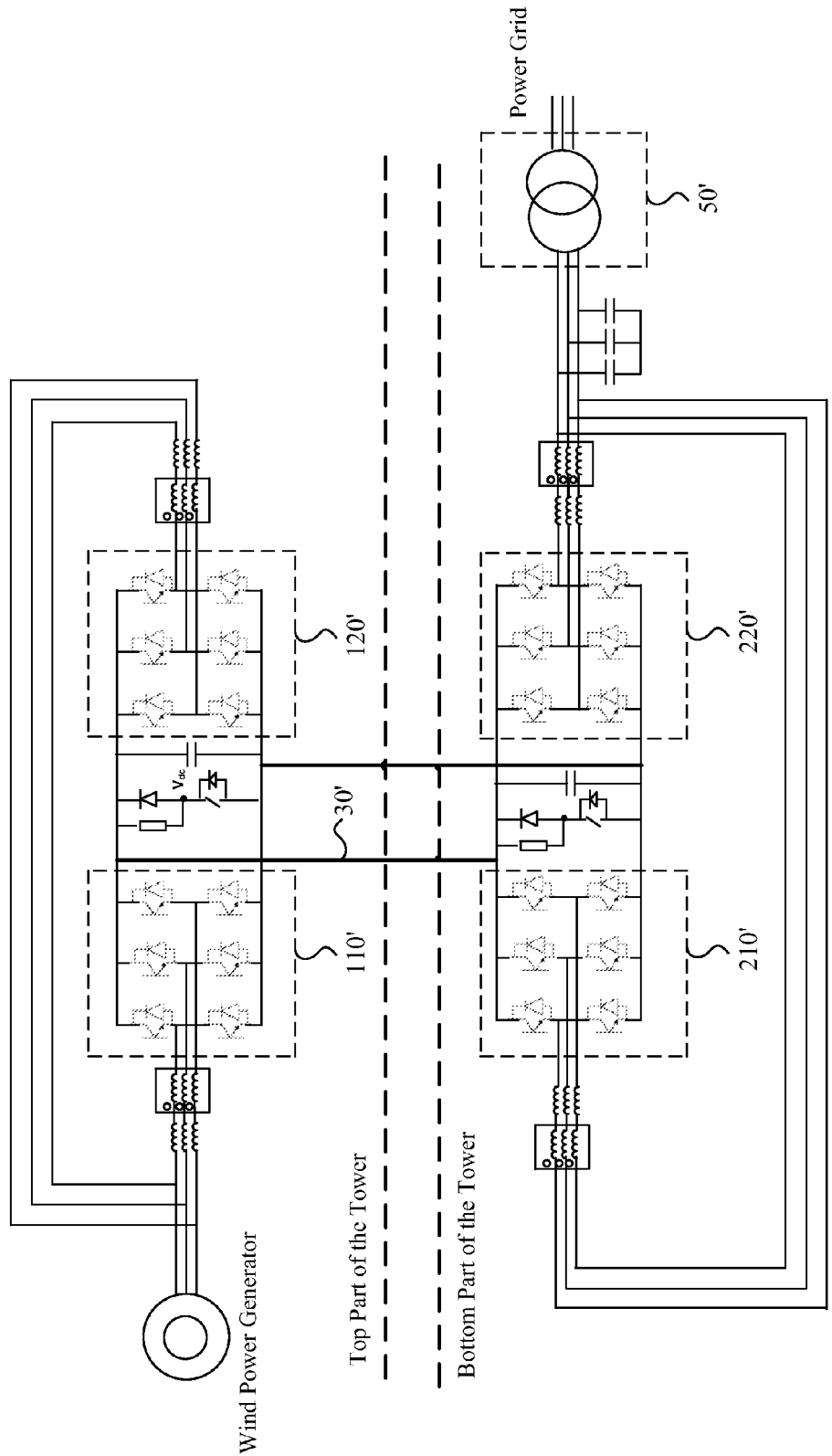
FIG. 4 illustrates a schematic circuit structure diagram showing a wind power converter according to another embodiment of the present invention when the wind power generator is a three-phase full power wind power generator.

FIG. 4 illustrates a schematic circuit structure diagram showing a wind power converter according to another embodiment of the present invention when the wind power generator is a three-phase full-power wind power generator. Referring to FIG. 4, the wind power converter includes generator-side converters 110' and 120', grid-side converters 210' and 220', at least one DC bus 30' and an isolation transformer 50', wherein the generator-side converters 110' and 120' both are two-level circuits.

Herein, the generator-side converters 110' and 120', the grid-side converters 210' and 220', the at least one DC bus 30' and the isolation transformer 50' in FIG. 4 are similar to or the same as the generator-side converters 110 and 120, the grid-side converters 210 and 220, the DC bus 30 and the isolation transformer 50 in FIG. 3. Thus, for simplicity of description, it is not illustrated herein again.

It should be pointed out that, in the wind power converter shown in FIG. 4, the wind power generator is a three-phase full-power wind power generator including only one set of three-phase windings. Thus, the three-phase windings of the wind power generator should be electrically connected to respective AC input sides of the generator-side converters 110' and 120'. Preferably, the three-phase windings of the three-phase power generator are electrically connected to each of the AC input sides of the generator-side converters 110' and 120' via a circulating-current restraining unit.

Furthermore, the isolation transformer 50' is a double-winding transformer, the single winding at the primary side thereof is connected to each of the AC output sides of the first grid-side converter 210' and the second grid-side converter 220' via the circulating-current restraining unit.

Figure 5:
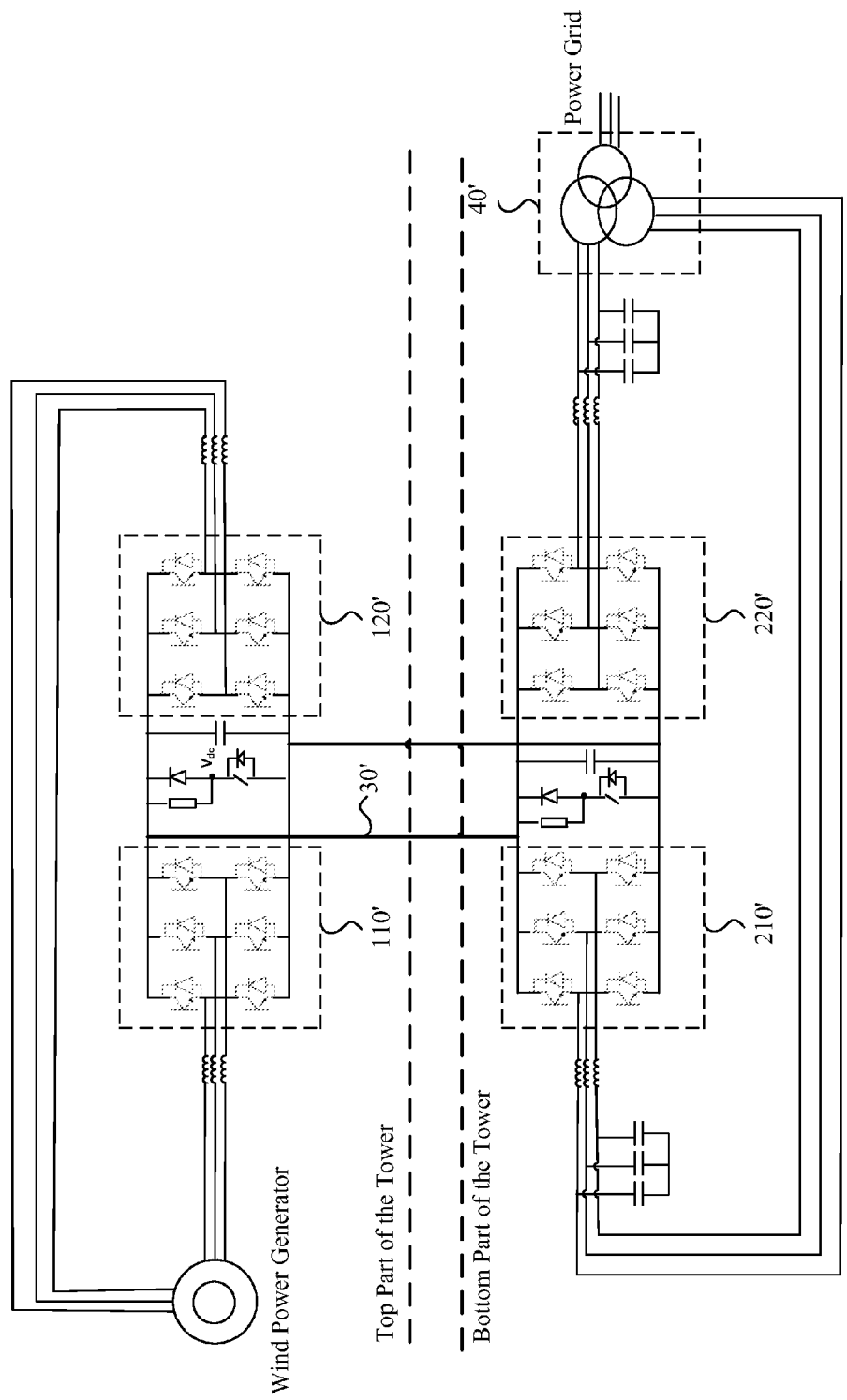
FIG. 5 illustrates a schematic circuit structure diagram showing a wind power converter according to another embodiment of the present invention when the wind power generator is a six-phase full-power wind power generator.

FIG. 5 illustrates a schematic circuit structure diagram showing a wind power converter according to another embodiment of the present invention when the wind power generator is a six-phase full-power wind power generator. Similar to FIG. 4, the two-level wind power converter in FIG. 5 also includes the generator-side converters 110' and 120', the grid-side converters 210' and 220', and at least one DC bus 30', where the generator-side converters 110' and 120' are both two-level circuits. Unlike FIG. 4, the wind power generator in the wind power converter in FIG. 5 is a six-phase full-power wind power generator having two sets of three-phase windings. Thus, one set of three-phase windings may be electrically connected to the AC input side of the generator-side converter 110', and the other set of three-phase windings may be electrically connected to the AC input side of the generator-side converter 120'.

Referring to FIG. 5, the DC output sides of the generator-side converters 110' and 120' are connected in parallel, and the DC input sides of the grid-side converters 210' and 220' are connected in parallel, and the DC output sides of the generator-side converters 110' and 120' are connected to the DC input sides of the grid-side converters 210' and 220' by the DC bus 30'. Certainly, the DC output sides of the generator-side converters 110' and 120' may not have to be connected in parallel, and are instead, are connected from the top to bottom parts of the tower via respective DC buses. Thus, even when an operation fault occurs in the generator-side converter 110', the wind power converter of the present invention can still transfer the outputted DC voltage to the grid-side converters 210' and 220' by a generator-side converter 120'. On the other hand, even when an operation fault occurs in the grid-side converter 210', the wind power converter of the present invention can still transfer the DC voltage outputted by the generator-side converters 110' and 120' to the isolation transformer 40' by the grid-side converter 220', so as to improve operation reliability and stability of the wind power converter.

Figure 6:
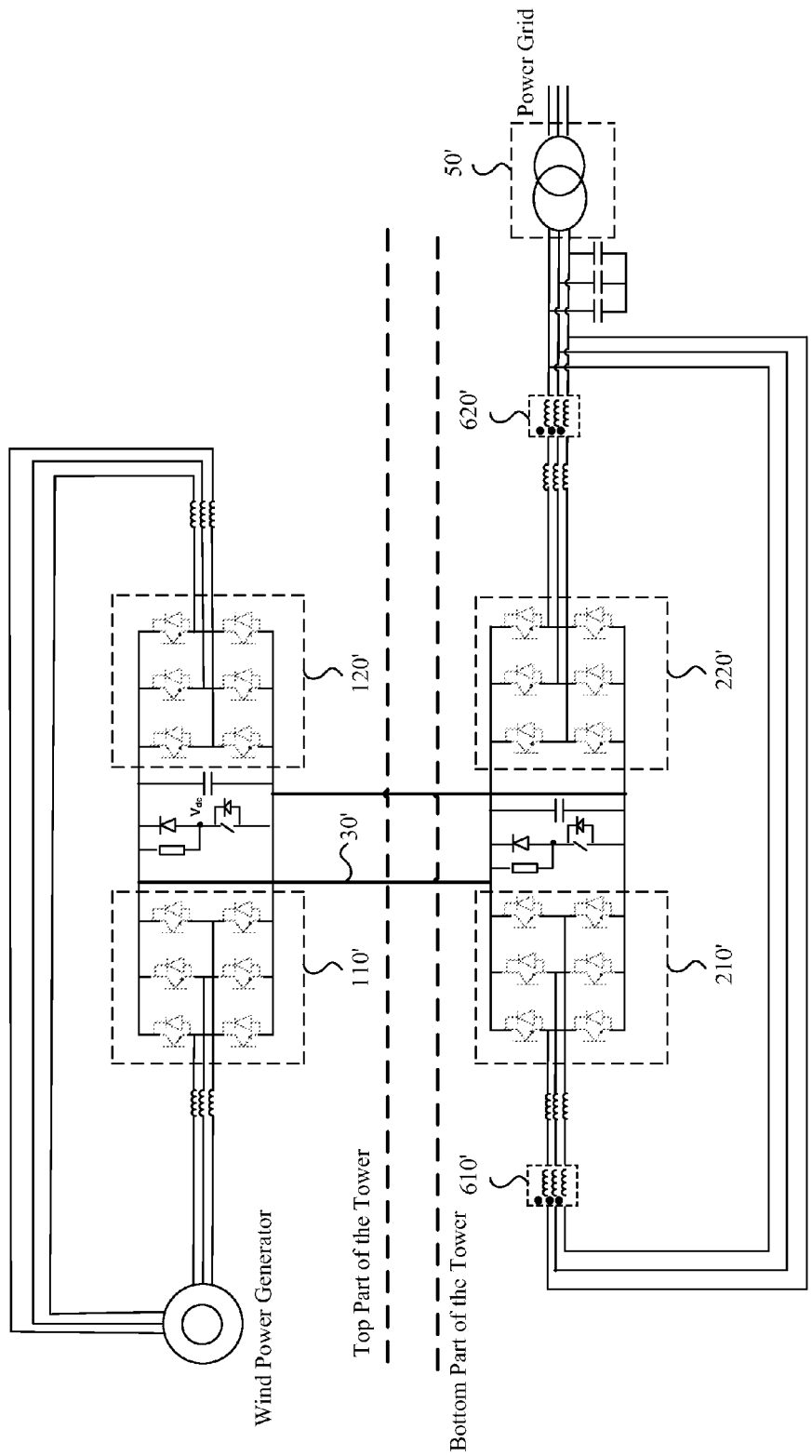
FIG. 6 illustrates a schematic circuit structure diagram showing an alternative example of the wind power converter shown in FIG. 5.

FIG. 6 illustrates a schematic circuit structure diagram showing an alternative example of the wind power converter shown in FIG. 5. The difference found in a comparison between FIGS. 5 and 6 is that, the two-level wind power converter in FIG. 6 includes an isolation transformer 50'. The isolation transformer 50' is a two-winding transformer. That is, the primary side as well as the secondary side has single windings. As shown in FIG. 6, a single winding at the primary side of the isolation transformer 50' is electrically coupled to the AC output side of the grid-side converter 210' via a circulating-current restraint unit 610', and meanwhile the single winding at the primary side of the isolation transformer 50' is electrically coupled to the AC output side of the grid-side converter 220' by another circulating-current restraint unit 620', so as to restrain the circulating current of respective AC output sides of the grid-side converters 210' and 220' by the circulating-current restraint units 610' and 620'.

In a specific embodiment, a filter unit may be further arranged between the circulating-current restraint unit 610' (or the circulating-current restraint unit 620') and the primary side of the isolation transformer 50', so as to filter the AC voltage inputted into the isolation transformer 50'.

Figure 7:
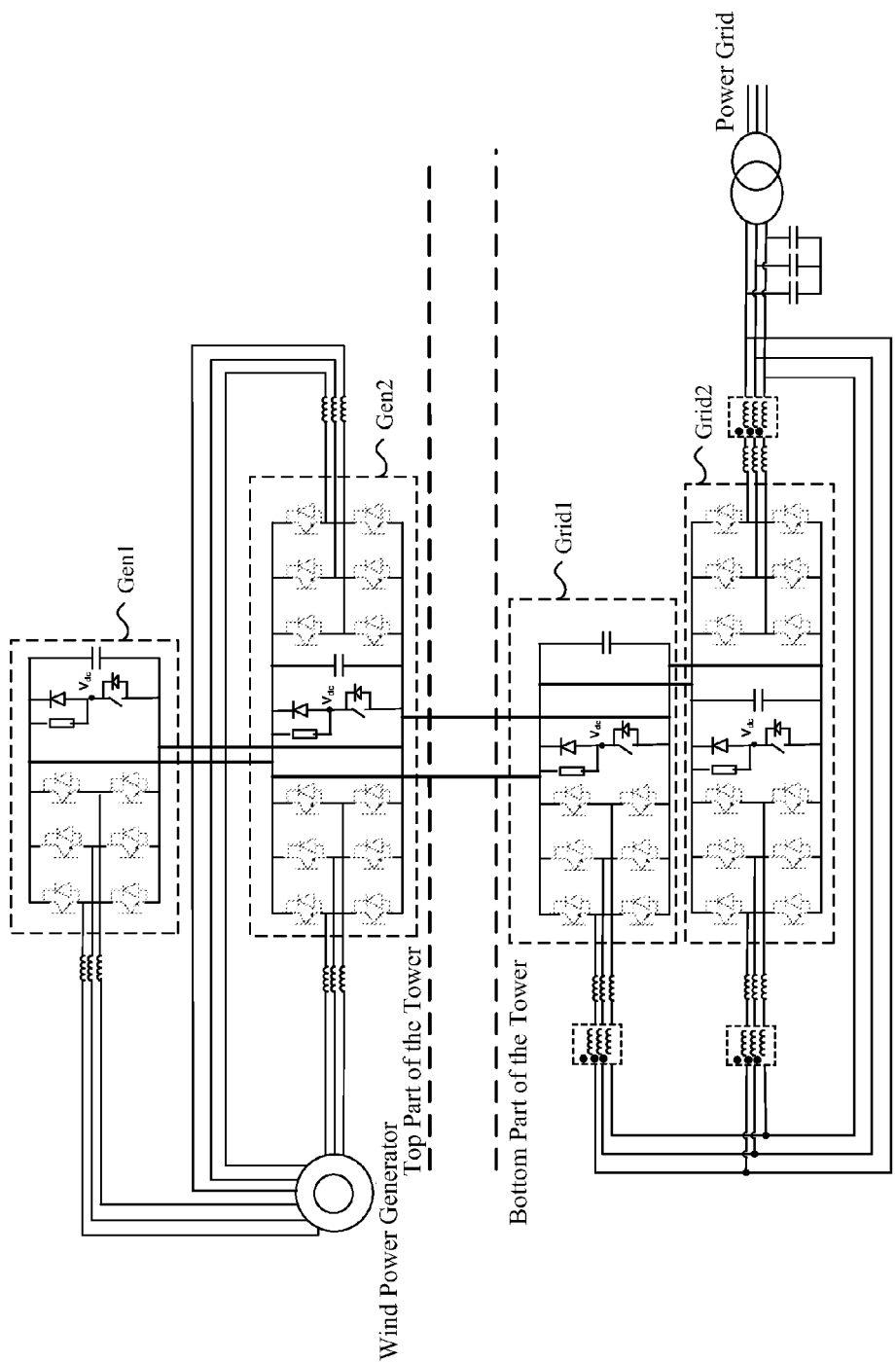
FIG. 7 illustrates a schematic circuit structure diagram showing the wind power converter according to another embodiment of the present invention when the wind power generator is a nine-phase full-power wind power generator.

FIG. 7 illustrates a schematic circuit structure diagram showing the wind power converter according to another embodiment of the present invention when the wind power generator is a nine-phase full-power wind power generator.

Referring to FIG. 7, the wind power converter includes two sets of generator-side converters and two sets of grid-side converters, i.e. the first set of generator-side converters Gen1 and the second set of generator-side converters Gen2; and the first set of grid-side converters Grid1 and the second set of grid-side converters Grid2. The first set of generator-side converters Gen1 includes a single generator-side converter, and the second set of generator-side converters Gen2 includes a first generator-side converter and a second generator-side converter. Similarly, the first set of grid-side converters Grid1 includes a single grid-side converter, and the second set of grid-side converters Grid2 includes a first grid-side converter and a second grid-side converter.

The AC input sides of the generator-side converters in the first set of generator-side converters Gen1 are connected to a first set of three-phase windings of the nine-phase power generator, and the AC input sides of the first generator-side converter in the second set of generator-side converters Gen2 are connected to a second set of three-phase windings, and the AC input sides of the second generator-side converter in the second set of generator-side converters Gen2 are connected to a third set of three-phase windings.

In a specific embodiment, the DC output sides of the first set of generator-side converters Gen1 are electrically connected to the DC output sides of the second set of generator-side converters Gen2, i.e. the DC output sides of the first and second generator-side converters in the second set of generator-side converters Gen2 are connected in parallel via a DC bus. Similarly, the DC input sides of the first set of grid-side converters Grid1 are electrically connected to the DC input sides of the second set of grid-side converters Grid2, i.e. the DC input sides of the first and second grid-side converters in the second set of grid-side converters Grid2 are connected in parallel via a DC bus. The DC output sides of the second set of generator-side converters Gen2 are connected to the DC input sides of the first set of grid-side converters Grid1 via another DC bus. Alternatively, the DC output sides of the first set of generator-side converters Gen1 are connected to the DC input sides of the first set of grid-side converters Grid1 via a DC bus.

Figure 8:
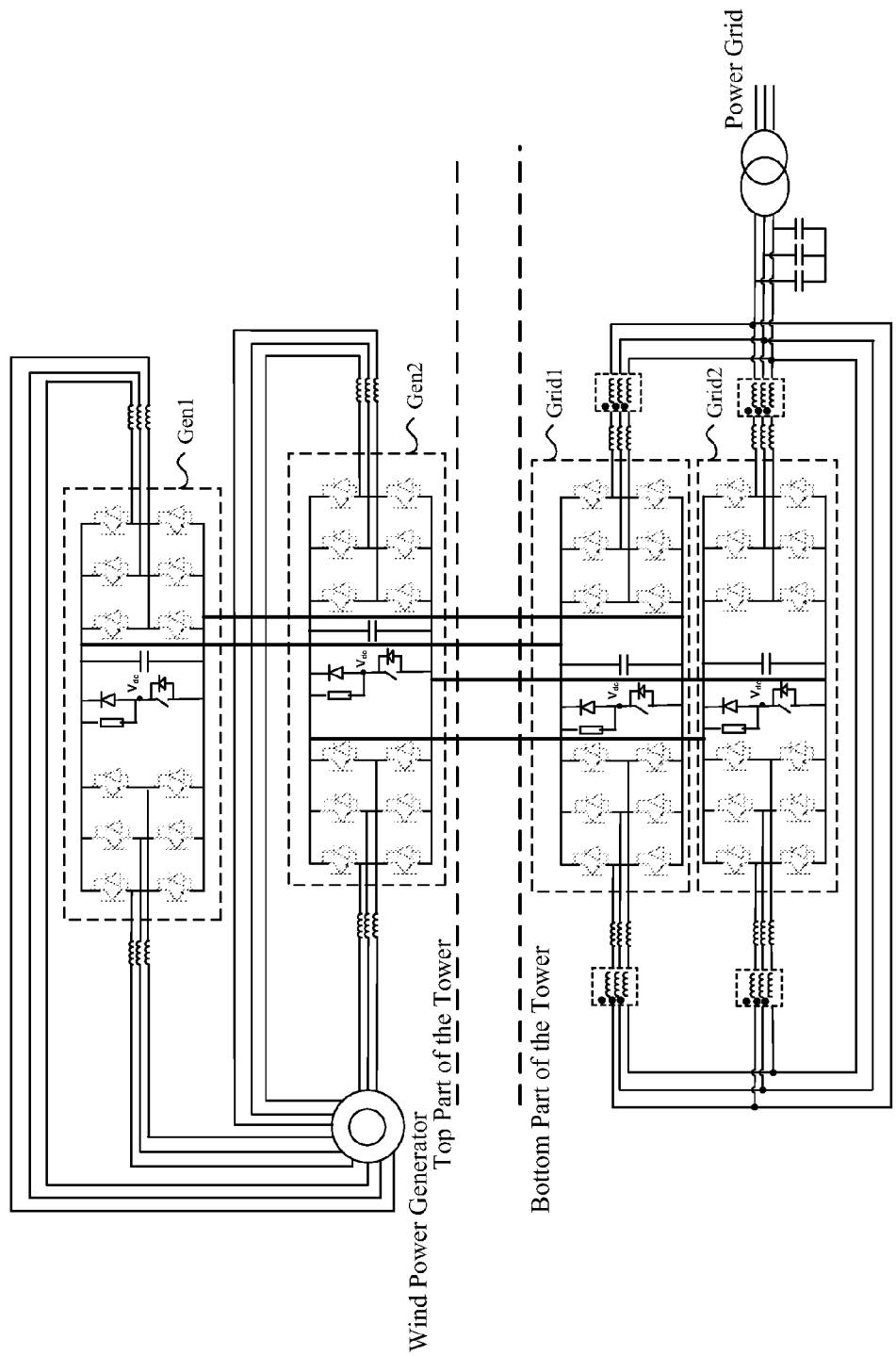
FIG. 8 illustrates a schematic circuit structure diagram showing the wind power converter according to another embodiment of the present invention when the wind power generator is a twelve-phase full-power wind power generator.

FIG. 8 illustrates a schematic circuit structure diagram showing the wind power converter according to another embodiment of the present invention when the wind power generator is a twelve-phase full-power wind power generator.

Referring to FIG. 8, the wind power converter includes two sets of generator-side converters and two sets of grid-side converters, i.e. the first set of generator-side converters Gen1 and the second set of generator-side converters Gen2; and the first set of grid-side converters Grid1 and the second set of grid-side converters Grid2. The first set of generator-side converters Gen1 includes a first generator-side converter and a second generator-side converter, and the second set of generator-side converters Gen2 also includes a first generator-side converter and a second generator-side converter. Similarly, the first set of grid-side converters Grid1 includes a first grid-side converter and a second grid-side converter, and the second set of grid-side converters Grid2 also includes a first grid-side converter and a second grid-side converter.

The AC input side of the first generator-side converter in the first set of generator-side converters Gen1 is connected to a first three-phase winding, and the AC input side of the second generator-side converter in the first set of generator-side converters Gen1 is connected to a second three-phase winding; the AC input side of the first generator-side converter in the second set of generator-side converters Gen2 is connected to a third three-phase winding, and the AC input side of the second generator-side converter in the second set of generator-side converters Gen2 is connected to a fourth three-phase winding.

In a specific embodiment, the DC output sides of the first set of generator-side converters Gen1 are connected to the DC input sides of the first set of grid-side converters Grid1 via a DC bus, and the DC output sides of the second set of generator-side converters Gen2 are connected to the DC input sides of the second set of grid-side converters Grid2 via another DC bus. In another specific embodiment, the DC output sides of the first set of generator-side converters Gen1 are connected to the DC input sides of the second set of grid-side converters Grid2 via a DC bus, and the DC output sides of the second set of generator-side converters Gen2 are connected to the DC input sides of the first set of grid-side converters Grid1 via another DC bus.

It can be seen that, the first set of generator-side converters Gen1 and the second set of generator-side converters Gen2 are mutual redundancies, and the first set of grid-side converters Grid1 and the second set of grid-side converters Grid2 are mutual redundancies. When the first set of generator-side converters Gen1 is out of order, the outputted DC voltage can be transferred to the grid-side converter by the second set of generator-side converters Gen2, or alternatively when the first set of grid-side converters Grid1 is out of order, the outputted AC voltage can be transferred to the isolation transformer by the second set of grid-side converters Grid2. It should be understood by those skilled in the art that, the single-winding isolation transformer in FIG. 8 is merely an example for illustration, and the present invention is not limited thereto. For example, in other embodiments, the wind power converter includes a multi-winding isolation transformer, and each winding at the primary side of the multi-winding isolation transformer is connected to respective AC output sides of grid-side converters.

Figure 9:
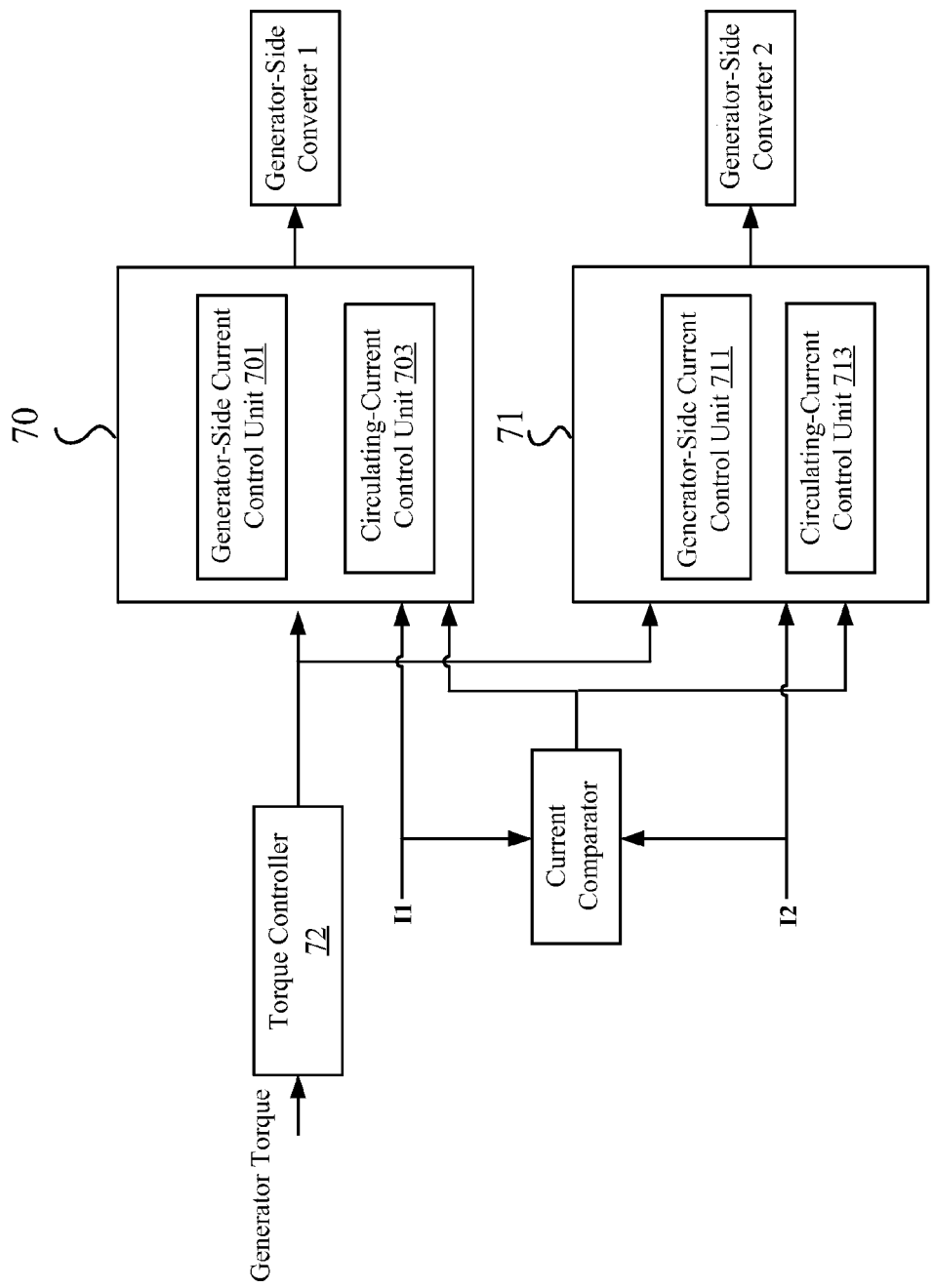
FIG. 9 illustrates a structural block diagram showing that the generator-side converter of the wind power converter shown in FIGS. 1-8 is performing control on circulating current.

FIG. 9 illustrates a structural block diagram showing that he generator-side converter of the wind power converter shown in FIGS. 1-8 is performing control on circulating current. Referring to FIG. 9, the wind power converter structure further includes a first circulating-current control module. The first circulating-current control module is arranged at the side of the generator-side converters, such that the first circulating-current control module may also be referred to as a generator-side circulating-current control module.

In particular, the generator-side circulating-current control module includes a torque controller 72, two generator-side control modules 70 and 71, and a current comparator 73. The torque controller 72 receives a generator torque of the wind power generator and outputs a given current signal corresponding to the generator torque. Each generator-side control module in the generator-side control modules 70 and 71 includes a generator-side current control unit and a circulating-current control unit. More particularly, the generator-side current control unit 701 is electrically connected to the torque controller 72 and the corresponding generator-side converter (such as the first generator-side converter), thereby performing current control according to the current signal I1 inputted into the generator-side converter and the given current signal outputted by the torque controller 72. The generator-side current control unit 711 is electrically connected to the torque controller 72 and the corresponding generator-side converter (such as the second generator-side converter), thereby controlling the current according to the current signal I2 inputted into the generator-side converter and the given current signal outputted by the torque controller 72.

The current comparator 73 is electrically connected to the circulating-current control units 703 and 713 for receiving and then comparing the current signal I1 inputted into the first generator-side converter and the current signal I2 inputted into the second generator-side converter, so as to output a comparison signal (such as I1-I2 or I2-I1). The comparison signal is transferred to the circulating-current control units 703 and 713, thereby controlling the circulating current formed between the first generator-side converter and the second generator-side converter. When the current signal I1 is equal to the current signal I2, the comparison signal inputted into the circulating-current control units 703 and 713 is zero, which means that the circulating current between the first and second generator-side converters is cancelled.

Figure 10:
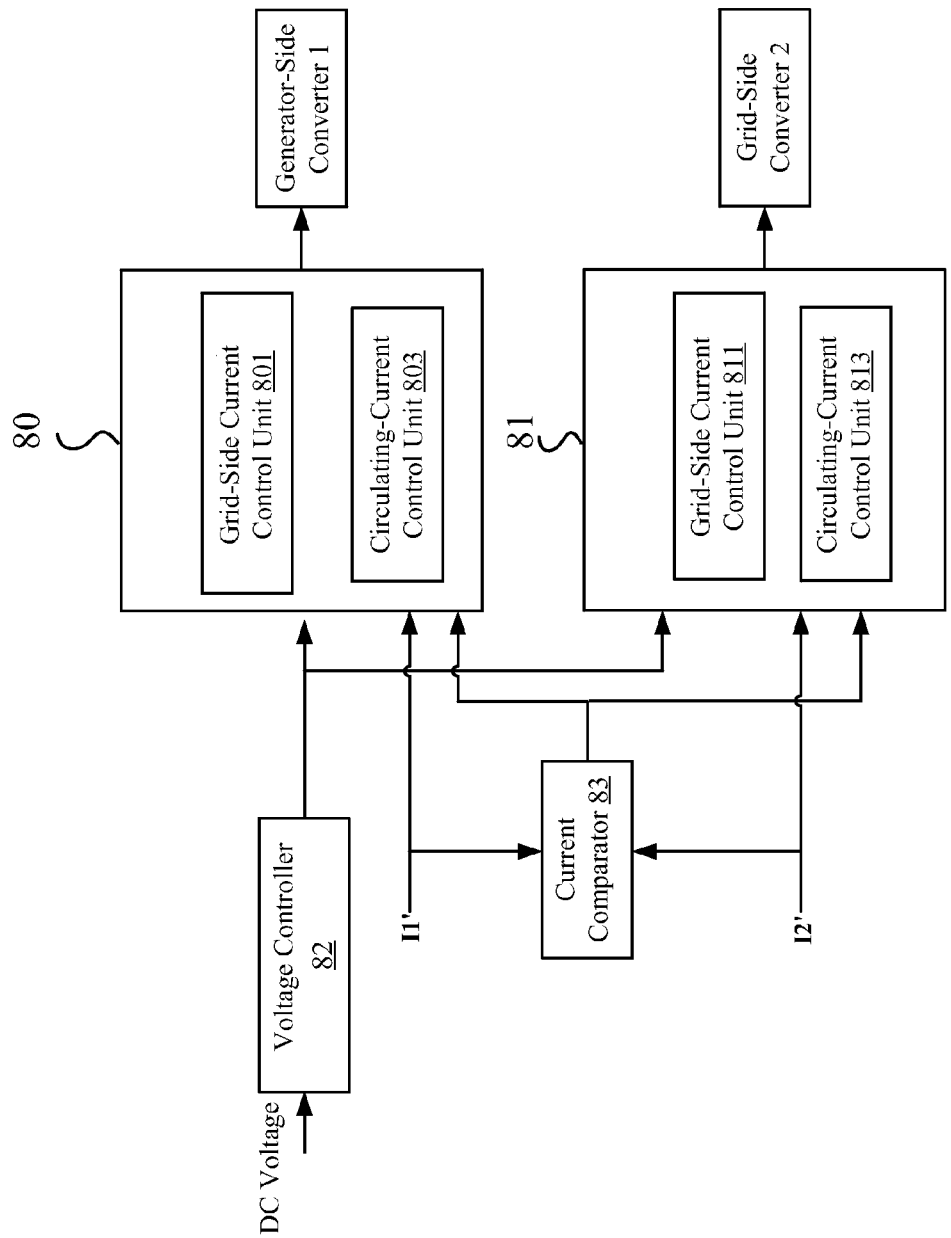
FIG. 10 illustrates a structural block diagram showing that the grid-side converter of the wind power converter shown in FIGS. 1-8 is performing control on the circulating current.

FIG. 10 illustrates a structural block diagram showing the grid-side converter of the wind power converter shown in FIGS. 1-8 is performing control on circulating current. Referring to FIG. 10, the wind power converter structure further includes a second circulating-current control module. The second circulating-current control module is arranged at the side of the multiple grid-side converters, such that the second circulating-current control module may also be referred to as a grid-side circulating-current control module.

In particular, the grid-side circulating-current control module includes a voltage controller 82, two grid-side control modules 80 and 81, and a current comparator 83. The voltage controller 82 receives the DC voltage transferred by the DC bus, and outputs a given current signal corresponding to the DC voltage. Each grid-side control module in the grid-side control modules 80 and 81 includes a grid-side current control unit and a circulating-current control unit. More particularly, the grid-side current control unit 801 is electrically connected to the voltage controller 82 and the corresponding grid-side converter (such as the first grid-side converter), thereby controlling the current according to the current signal I1' inputted into the grid-side converter and the given current signal outputted by the voltage controller 82. The grid-side current control unit 811 is electrically connected to the voltage controller 82 and the corresponding grid-side converter (such as the second grid-side converter), thereby controlling the current according to the current signal I2' inputted into the grid-side converter and the given current signal outputted by the voltage controller 82.

The current comparator 83 is electrically connected to the circulating-current control units 803 and 813 for receiving and comparing the current signal I1' inputted into the first grid-side converter with the current signal I2' inputted into the second grid-side converter so as to output a comparison signal (such as I1'-I2' or I2'-I1'). The comparison signal is transferred to the circulating-current control units 803 and 813, thereby controlling the circulating current formed between the first grid-side converter and the second grid-side converter. When the current signal I1' is equal to the current signal I2', the comparison signal inputted into the circulating-current control units 803 and 813 is zero, which means that the circulating current between the first and second grid-side converters is cancelled.

By adopting the wind power converter structure of the present invention and the wind power generation system including the converter structure, the generator-side converters of the wind power converter are arranged in the nacelle located on the top part of the tower; the grid-side converters of the wind power converter are arranged on the bottom part of the tower or outside the tower; and the power is transferred by the DC bus connected between the DC output side of the generator-side converter and the DC input side of the grid-side converter, thus not only reducing the cost of cables required for transferring signals between the top and bottom of the tower, but also balancing the bearing load of the tower. Furthermore, when the full-power wind power generator is a multi-winding power generator, multiple three-phase PWM rectifiers may be arranged in the top part of the tower, and the output terminals of these three-phase PWM rectifiers are connected in parallel, and multiple three-phase PWM inverters are arranged on the bottom part of the tower, and the output terminals of these three-phase PWM inverters are connected in parallel, so as to receive the DC voltage transferred by the DC bus. Thus, a mutual redundancy safety operation mechanism can be performed between the three-phase PWM rectifiers and the three-phase PWM inverters so as to improve the operation reliability and stability of the wind power converter. When a PWM rectifier unit or a three-phase PWM inverter unit is out of order, other PWM rectifier units or PWM inverter units can still operate normally.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. A converter structure used in a wind power generation system comprising a tower, the converter structure comprising:
- a plurality of generator-side converters arranged in a nacelle located on a top part of the tower, each of the generator-side converters comprising an AC input side and a DC output side, wherein the AC input side of each of the generator-side converters is connected to a three-phase winding of the wind power generator, and the DC output side of each of the generator-side converters is connected in parallel and outputs a DC voltage;
- a plurality of grid-side converters arranged on a bottom part of the tower or outside the tower, each of the grid-side converters comprising a DC input side and an AC output side, wherein the DC input sides of the grid-side converters are connected in parallel and coupled to the DC output sides of the generator-side converters, respectively;
- at least one DC bus connected between the DC output sides of the generator-side converters and the DC input sides of the grid-side converters; and
- an isolation transformer of which a primary side is connected to the AC output side of each of the grid-side converters, wherein a secondary side of the isolation transformer is connected to a power grid, and the isolation transformer boosts and transfers an AC voltage outputted by the AC output sides of the grid-side converters to the power grid.

2. The converter structure of claim 1, wherein the generator-side converters comprise a first set of generator-side converters and a second set of generator-side converters, and the grid-side converters comprise a first set of grid-side converters and a second set of grid-side converters,
wherein the DC output sides of the first set of generator-side converters are connected to the DC input sides of the first set of grid-side converters via a DC bus, and the DC output sides of the second set of generator-side converters are connected to the DC input sides of the second set of grid-side converters via another DC bus.

3. The converter structure of claim 2, wherein the wind power generator is a 3N-phase wind power generator, wherein N is a natural number, and at least one of the first set of grid-side converters and the second set of generator-side converters comprises a first generator-side converter and a second generator-side converter, wherein, when N is 1, the AC input sides of the first generator-side converter and the second generator-side converter are connected to a three-phase windings of a three-phase wind power generator; and when N is greater than 1, the AC input side of the first generator-side converter is electrically connected to a three-phase winding of a three-phase wind power generator, and the AC input side of the second generator-side converter is electrically connected to another three-phase winding of the three-phase wind power generator.

4. The converter structure of claim 3, wherein the converter structure further comprises a first circulating-current control module arranged in the generator-side converters, and the first circulating-current control module comprises:
- a torque controller for receiving a generator torque of the wind power generator;
- a generator-side control module comprising a generator-side current control unit and a circulating-current control unit, wherein the generator-side current control unit is electrically connected to the torque controller and the generator-side converter for controlling current according to the current signal inputted into the generator-side converter and a given signal;
- a current comparator for receiving and comparing the current signal inputted into the first grid-side converter with the current signal inputted into the second grid-side converter, so as to output a comparison signal,
wherein the comparison signal is transferred to a corresponding circulating-current control unit so as to control the circulating current formed between the first generator-side converter and the second generator-side converter.

5. The converter structure of claim 2, wherein at least one of the first set of grid-side converters and the second set of grid-side converters comprises a first grid-side converter and a second grid-side converter.

6. The converter structure of claim 5, wherein the isolation transformer is a multi-winding transformer, windings at the primary side of the isolation transformer are coupled to the respective AC output sides of the first grid-side converter and the second grid-side converter, and the secondary side of the of the isolation transformer is connected to the power grid.

7. The converter structure of claim 6, wherein the respective AC output sides of the first grid-side converters and the second grid-side converter are connected to the isolation transformer via a filter unit.

8. The converter structure of claim 5, wherein the isolation transformer is a double-winding transformer, and a single winding at the primary side of the dual-winding transformer is connected to each of the AC output sides of the first grid-side converter and the second grid-side converter via a circulating-current restraining unit.

9. The converter structure of claim 5, wherein the converter structure further comprises a second circulating-current control module arranged in the generator-side converters, and the second circulating-current control module comprises:
- a voltage controller for receiving the DC voltage transferred by the DC bus;
- a grid-side control module comprising a grid-side current control unit and a circulating-current control unit, wherein the grid-side current control unit is electrically connected to the voltage controller and the grid-side converter for performing current control according to the current signal inputted into the grid-side converter and a given signal; and
- a current comparator for receiving and comparing the current signal inputted into the first grid-side converter with the current signal inputted into the second grid-side converter, so as to output a comparison signal,
wherein the comparison signal is transferred to a corresponding circulating-current control unit so as to control the circulating current formed between the first and the second grid-side converters.

10. The converter structure of claim 1, wherein the generator-side converters comprise a first set of generator-side converters and a second set of generator-side converters, and the grid-side converters comprise a first set of grid-side converters and a second set of grid-side converters,
wherein the DC output sides of the first set of generator-side converters and the DC output sides of the second set of generator-side converters are connected in parallel via a DC bus, and the DC input sides of the first set of grid-side converters and the DC input sides of the second set of grid-side converters are connected in parallel, and the DC bus is further connected to the DC input sides of the first set of grid-side converters or the second set of grid-side converters.

11. The converter structure of claim 10, wherein the wind power generator is a 3N-phase wind power generator, wherein N is a natural number, and at least one of the first set of grid-side converters and the second set of generator-side converters comprises a first generator-side converter and a second generator-side converter, wherein, when N is 1, the AC input sides of the first generator-side converter and the second generator-side converter are connected to a three-phase windings of a three-phase wind power generator; and when N is greater than 1, the AC input side of the first generator-side converter is electrically connected to a three-phase winding of a three-phase wind power generator, and the AC input side of the second generator-side converter is electrically connected to another three-phase winding of the three-phase wind power generator.

12. The converter structure of claim 11, wherein the converter structure further comprises a first circulating-current control module arranged in the generator-side converters, and the first circulating-current control module comprises:
   a torque controller for receiving a generator torque of the wind power generator;
   a generator-side control module comprising a generator-side current control unit and a circulating-current control unit, wherein the generator-side current control unit is electrically connected to the torque controller and the generator-side converter for controlling current according to the current signal inputted into the generator-side converter and a given signal;
   a current comparator for receiving and comparing the current signal inputted into the first grid-side converter with the current signal inputted into the second grid-side converter, so as to output a comparison signal,
   wherein the comparison signal is transferred to a corresponding circulating-current control unit so as to control the circulating current formed between the first generator-side converter and the second generator-side converter.

13. The converter structure of claim 10, wherein at least one of the first set of grid-side converters and the second set of grid-side converters comprises a first grid-side converter and a second grid-side converter.

14. The converter structure of claim 13, wherein the isolation transformer is a multi-winding transformer, windings at the primary side of the isolation transformer are coupled to the respective AC output sides of the first grid-side converter and the second grid-side converter, and the secondary side of the of the isolation transformer is connected to the power grid.

15. The converter structure of claim 14, wherein the respective AC output sides of the first grid-side converters and the second grid-side converter are connected to the isolation transformer via a filter unit.

16. The converter structure of claim 13, wherein the isolation transformer is a double-winding transformer, and a single winding at the primary side of the dual-winding transformer is connected to each of the AC output sides of the first grid-side converter and the second grid-side converter via a circulating-current restraining unit.

17. The converter structure of claim 13, wherein the converter structure further comprises a second circulating-current control module arranged in the generator-side converters, and the second circulating-current control module comprises:
   a voltage controller for receiving the DC voltage transferred by the DC bus;
   a grid-side control module comprising a grid-side current control unit and a circulating-current control unit, wherein the grid-side current control unit is electrically connected to the voltage controller and the grid-side converter for performing current control according to the current signal inputted into the grid-side converter and a given signal; and
   a current comparator for receiving and comparing the current signal inputted into the first grid-side converter with the current signal inputted into the second grid-side converter, so as to output a comparison signal,
   wherein the comparison signal is transferred to a corresponding circulating-current control unit so as to control the circulating current formed between the first and the second grid-side converters.

18. A full-power wind power generation system, comprising a wind power generator and a full-power wind power converter, wherein the full-power wind power converter adopts a converter structure of claim 1.

* * * * *